March 31, 1970 L. H. SCHWARTZ ETAL 3,503,448
LAWN TRIMMING APPARATUS
Filed Nov. 30, 1966
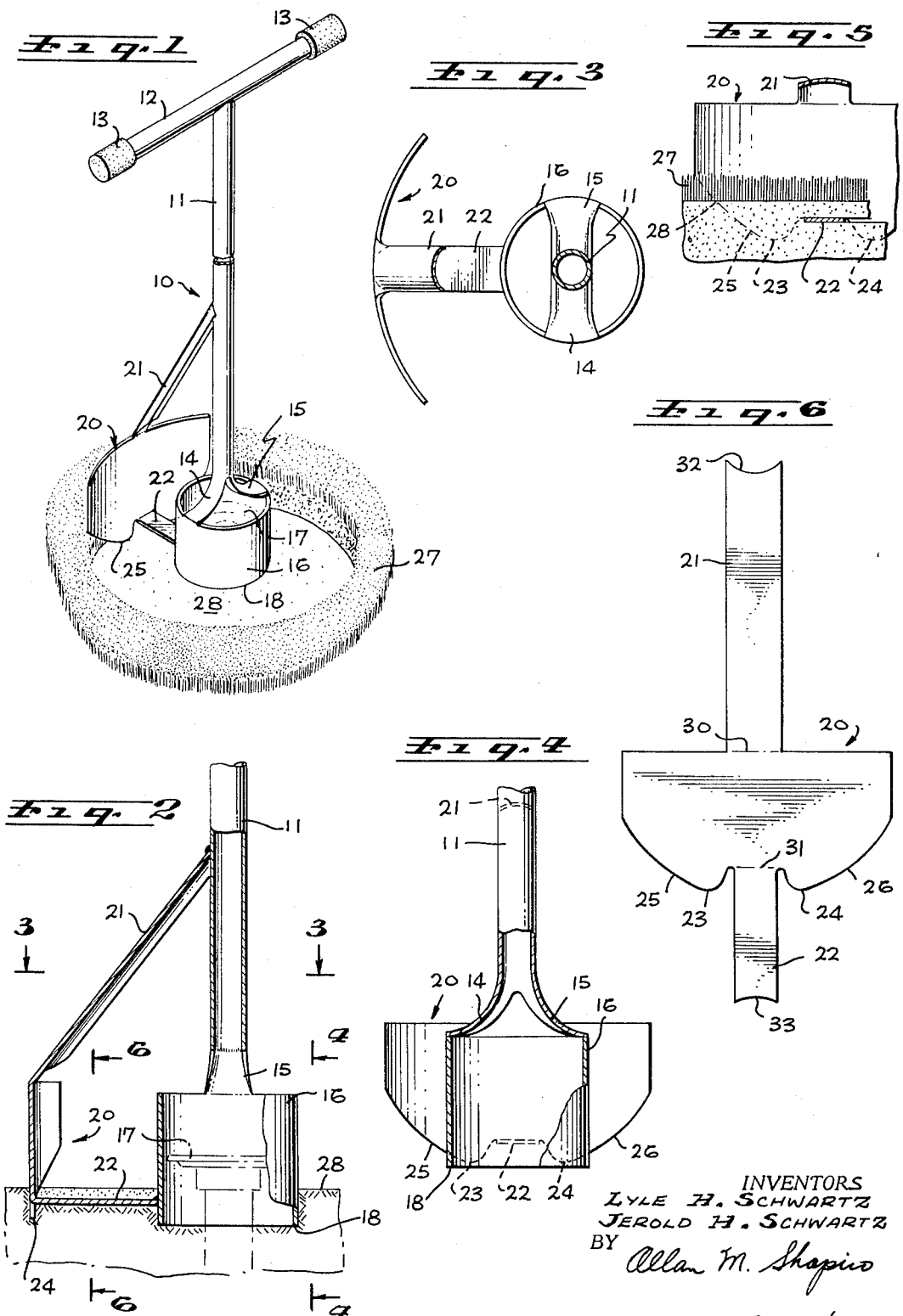
INVENTORS
LYLE H. SCHWARTZ
JEROLD H. SCHWARTZ
BY Allan M. Shapiro
ATTORNEY

United States Patent Office 3,503,448
Patented Mar. 31, 1970

3,503,448
LAWN TRIMMING APPARATUS
Lyle H. Schwartz, 13516 Oxnard St., Van Nuys, Calif. 91401, and Jerold H. Schwartz, 8030 Loma Verde St., Canoga Park, Calif. 91304
Filed Nov. 30, 1966, Ser. No. 597,911
Int. Cl. A01b 45/00
U.S. Cl. 172—18
6 Claims

ABSTRACT OF THE DISCLOSURE

A lawn trimming apparatus having an arcuate cutter and a horizontal cutter adapted to trim grass away from a lawn sprinkler head.

---

This invention relates to manually operated implements for edging or trimming grass around lawn sprinkler heads, and, more particularly, to a novel lawn trimming and edging apparatus which includes means for removing a portion of sod immediately surrounding the sprinkler head as well as a means for directing and leading unwanted leafy portions of lawn growth into a position whereby a cutting edge will sever the leafy growth.

Sprinkler systems are now largely used for the watering of lawns. A sprinkler system of conventional design involves the use of a plurality of sprinkler heads spaced at intervals in the lawn and placed at a sufficiently low level so as to avoid being an obstacle when a lawn mower is operated over the lawn. If the grass grows too close to the sprinkler heads, even though the lawn may be cut short, it will soon grow to a height that interferes with the proper spread of water from the sprinkler heads since portions of the spray will strike the blades or the leafy portions of the lawn growth.

In the past, many types of cutting devices and implements have been devised for cutting grass and sod away from lawn sprinkler heads. Almost all of the devices require for their operation a turning, twisting or downward plunging of the device so as to advance the cutting edge thereof around the sprinkler head. Most of such implements remove an excessive quantity of sod during the grass cutting operation, leaving a considerable depression about the sprinkler head. Furthermore, as the cutting blade or portion is advanced to sever leafy growth, the leafy growth tends to bend or deflect away from the cutting edge inasmuch as there is nothing against which the cutting edge can buck or react so as to effect a severing or cutting operation on the leafy growth. Consequently, the cutting implement is ineffective to sever such leafy growth, particularly when the growth is represented by young or slender shoots or blades of grass. In other words, there is no reaction member to cooperate with the blade or cutting edge.

In some instances, such as is represented by the device disclosed in U.S. Patent 2,882,600, devices rely for their effectiveness upon vertical percussive blows of an outer cylindrical cutting member with the earth itself being used as a reaction member. However, once the device has been initially used, its effectiveness is reduced for subsequent trimming operations inasmuch as initial quantities of sod have been removed against which the device would normally operate in trimming or severing leafy growth. Consequently, vertical percussion loads or blows do not solve the added problem of subsequent lawn trimming requirements about sprinkler heads. Furthermore, the devices of the prior art are generally not applicable where the sprinkler head is adjacent an obstruction, such as a sidewalk or curbstone.

The above difficulties and problems are obviated by the present invention which relies for its effectiveness upon not only an initial vertical percussive blow of an outer cylindrical cutting member but includes an arcuate trimming member which is disposed in fixed spaced relationship with respect to the cylindrical member that is rotated in a horizontal plane about the axis of the sprinkler head. The arcuate trimming portion includes a curved cutting blade which leads or directs the leafy growth to a position at the nip of the cutter defined by the cutting edge and the earth so that the earth operates as a reaction member for the cutting blade to sever the captured leafy growth in the nip thereof. Therefore, the resultant severing of the leafy growth is accomplished by a true cutting procedure rather than a chopping procedure as provided for by conventional lawn and grass trimming implements.

In one embodiment of the present invention, an elongated support member is included having a handle secured on one end thereof which is intended to be grasped by the user so that the implement may be readily rotated whereby torque may be imparted to a cylindrical cutter as well as to an arcuate cutting member. The opposite end of the support member is secured to the cylindrical cutter which is adapted to be indexed with and received over a sprinkler head so that lawn growth and sod immediately surrounding the head may be removed. The arcuate trimming cutting member is disposed in fixed spaced relationship with respect to the cylindrical cutter by means of an upper brace which is secured to the elongated member and a vane which radiates outwardly from the cylindrical cutter to the arcuate member or trimmer. Thereby, the arcuate trimming member or cutter rotates about the sprinkler head as the handle of the implement is rotated by the user. A particular feature of the present invention resides in the formation of the trimmer cutting blade so as to provide a pair of downwardly depending lobes separated by the vane which cut deeply into the ground so as to sever roots and the root system of the surrounding growth. Also, the cutting edges of the lobes are curvedly inclined so that, as the edges approach the growth, leafy portions thereof are directed to a nip defined between the cutting edge and the ground so that the ground becomes a reaction member against which the cutter operates to sever the growth as the cutter is moved in a horizontal plane.

Therefore, it is a primary object of the present invention to provide a novel lawn trimming implement which employs the earth as a reaction member against which a horizontally rotatable cutting element is effective to sever leafy growth from a portion of lawn surrounding a sprinkler head.

Another object of the present invention is to provide a novel lawn or grass cutting device which not only includes means for registering the device with respect to a particular sprinkler head in a watering system, whether such head is surrounded by lawn or adjacent an obstruction, but includes an arcuate cutter having inclined cutting edges adapted to lead or guide leafy growth into a position against the earth so that the cutting edge will effectively cut and remove the undesired leafy growth.

Still another object of the present invention is to provide a novel grass trimming device adapted to cut out a ring of sod around each sprinkler head in a watering system and which is effective to cut away undesired leafy growth from the vicinity of the sprinkler head in subsequent uses of the device after the initial sod has been removed so that the depression formed by the initial removal of the sod is maintained free and clear of the undesired growth.

Still a further object of the present invention is to provide a novel lawn trimming device for trimming grass away from lawn sprinkler heads which accomplishes its intended purpose very rapidly, efficiently and safely.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view of the novel lawn trimming apparatus of the present invention illustrated in a typical application or procedure for trimming undesired lawn growth and sod from around a conventional sprinkler head;

FIGURE 2 is an enlarged side elevational view, partly in section, of the trimmer member incorporated into the apparatus illustrated in FIGURE 1;

FIGURE 3 is a cross-sectional view of the apparatus shown in FIGURE 2 as taken in the direction of arrows 3—3 thereof;

FIGURE 4 is an elevational view, partly in section, of the apparatus as taken in the direction of arrows 4—4 of FIGURE 2;

FIGURE 5 is a sectional view of the apparatus shown in FIGURE 2 as taken in the direction of arrows 5—5 thereof; and FIGURE 6 is a layout view of the arcuate trimmer member illustrating the general pattern thereof from which the arcuate trimmer blade, lateral vane and upper brace are integrally formed prior to assembly with the handle support and cylindrical cutter portion.

Referring to FIGURE 1, the novel lawn trimming apparatus of the present invention is indicated in the general direction of arrow 10 which includes an elongated tubular support member 11 having a tubular handle 12 secured on one end of the support member midway between the opposite ends of the handle. The ends of the handle are adapted to receive caps or covers 13 which are preferably composed of a plastic-like material. The handle 12 is adapted to be grasped on opposite sides of the support member 11 by the hands of the user so that the device may be twisted and rotated whereby considerable torque is imparted to the support member 11.

The end of the support member 11 opposite to its end carrying the handle 12 is formed with a clevis represented by diverging leg portions 14 and 15 which terminate in securement with a cylindrical cutter 16. The cylindrical cutter 16 is placed in registry with a conventional sprinkler head 17 so that the cutter completely surrounds the peripheral edge of the sprinkler head and includes a cutting edge 18 adapted to forcibly engage with the sod surrounding the sprinkler head.

The lawn cutting apparatus also includes an arcuate trimming member 20 that is supported on the support member 11 by means of an upper brace 21 and is arranged in fixed spaced relationship to the cylindrical cutter 16 via a radiating vane 22. The trimmer portion 20 further includes a pair of downwardly depending lobes 23 and 24 that are separated by the vane 22 and which include curved cutting edges 25 and 26, respectively.

By rotating the device in a counter-clockwise direction, it can be seen that the leafy growth of the lawn represented in general by numeral 27, will be guided by the curvature of the cutting edge 25 to a location adjacent the ground represented by numeral 28 whereby the cutting edge 25 will sever the leafy growth against the ground which serves as a reaction member therefor. In this manner, the leafy growth is effectively severed by a cutting action and does not require repeated percussive blows to effectuate removal or severance.

Referring now in particular to FIGURE 2, it can be seen that the lobe 24 penetrates a predetermined distance into the ground 28 below the underside of vane 22. By projecting below the surface of the ground, root systems of the lawn are severed and subsequent growth into the cleared area between the edge of the lawn and the sprinkler head is greatly retarded. Furthermore, it can be seen that the annular peripheral edge of the sprinkler head 17 is substantially embraced by the cylindrical cutter 16 so that the sprinkler head may serve as a pivot point for registering the cut to be taken on the surrounding lawn. The device may also be pivoted about the sprinkler head so that when sod is intended to be removed from around the sprinkler head, the vane 22 may be directed in a spiral path about the sprinkler head. In this instance, the sod surrounding the sprinkler head between the outer periphery of the cutter 16 and the arcuate member 20 is effectively removed to a desired depth.

Referring now to FIGURE 3, it can be seen that the arcuate member 20 is curved in a circular plane concentric with the circular curve of the cylindrical member 16. By this construction, the device may be readily rotated in either direction without encountering binding or unnecessary sod removal. The circular cut effected by the arcuate portion 20 is clean and since there are no protrusions or irregularities in the member 20, the cut may be rapidly made. A feature of the present invention resides in the fact that the trimmer member 20 is quarter-circular and not a continuous circular member so that the lawn may be trimmed even when the sprinkler head is adjacent a sidewalk, curb or other pavement. A completely circular member would not be effective since a portion thereof would engage with the top of the pavement and could not be depressed. However, by employing a quarter-circular member, the terminating opposite side edges of the member can be brought to play directly against the pavement edge. In FIGURE 4, it can be seen that the inclined cutting edges 25 and 26 terminate at the lower extremity of the lobes 23 and 24 at a location slightly above the termination of the cutter 18 formed in the cylindrical member 16. It can also be seen that the brace 21 is curved so as to be rigid while the vane 22 is flat.

As illustrated in FIGURE 6, the brace 21, arcuate trimmer portion 20 and vane 22 may be fabricated from a single blank configuration to a pattern corresponding to the respective portion shapes. The trimmer member 20 may be formed into its arcuate configuration and the brace 21 may be bent into its curved shape while the vane 22 and the brace 21 may be bent at location 30 and 31 to provide the angular orientation as shown in FIGURE 2. After the blank has been so shaped, attachment of the free ends of the vane 22 and the brace 21 may be made to the cylindrical member 16 and the support member 11 by any suitable means, such as by welding, for example. To effect a proper attachment with the curved periphery of support member 11 and the cylindrical member or cutter 16, the free ends of the brace 21 and the vane 22 are formed with a curved cut as at numerals 32 and 33, respectively.

As can be understood from the foregoing description, the lawn trimming apparatus 10 of the present invention may be used by initially registering the cylindrical cutter 16 with the sprinkler head 17 and the apparatus is urged downwardly in a single or repetitive vertical action to effect vertical percussive blows whereby the cutting edge 18 penetrates a portion of the sod surrounding the sprinkler head. Also, the cutting edges 25 and 26 of the lobes 23 and 24 will similarly penetrate the sod. By angling the major longitudinal axis of the apparatus with respect to the central vertical axis of the sprinkler head and by rotatably manipulating the apparatus, the vane 22 is caused to move in a spiral path about the sprinkler head to a desired depth to loosen the sod for subsequent removal.

As the apparatus is rotated in either a clockwise or counter-clockwise direction, the leafy growth of the lawn is directed by a curvature of the cutting edges 25 and 26 to a location adjacent the ground 28 where the undesired leafy growth is cut. Of substantial significance is the fact that once the initial lawn trimming and sod removing procedure has taken place, the apparatus may be used to repeatedly trim the lawn growth. Employing conventional tools is ineffective to remove additional lawn growth after the subsequent trimming procedure since such conventional tools fail to provide for the leading or guiding of the undesired growth to a suitable cutting position. The apparatus of the present invention employs the ground as a reaction member against which the cutting blades 25 and 26 cooperate to sever the leafy lawn growth.

While particular embodiments of the present invention have been shown and described, it will be obvious to those skilled in the art that changes and modifications may be made without departing from this invention in its broader aspects, and, therefore, the aim is to cover all such changes and modifications as fall within the true spirit and scope of this invention.

What is claimed is:

1. In a lawn trimming apparatus for removing undesirable leafy growth and sod surrounding a sprinkler head and comprising a cylindrical cutting member coaxially disposable about a sprinkler head and handle means secured to the cylindrical cutting member in coaxial relationship therewith and adapted to be manually rotated about the sprinkler head, the improvement comprising:

an arcuate trimmer portion carried by said cylindrical cutting member and handle means and having an overall arcuate length of approximately 90° of a circle concentric with said cylindrical cutting member, said trimmer portion comprising an arcuately spaced pair of downwardly projecting cutting lobes located symmetrically relative to the trimmer portion and having opposite leading edges, each of said leading edges being shallowly curved downwardly and backwardly from a portion above ground surface to a lower lobe extremity insertable into the ground for guiding such leafy growth down to the ground during rotary movement whereby the ground acts as a reaction member during growth severance, each of said cutting lobes having a trailing edge continuous with and curved upwardly and backwardly from its said leading edge and terminating below the ground surface, 2. The invention as defined in claim 1 wherein said cutting lobes are arcuately spaced, and said trimmer portion having an intermediate region between said lobes with a lower intermediate extremity vertically spaced above said lower lobe extremities and below ground surface, each of said trailing edges terminating at said lower intermediate extremity, whereby, in either direction of rotation of the apparatus about the sprinkler head, one of said leading edges and the other of said trailing edges constitute a pair of successive cutting elements.

3. The invention as defined in claim 2 comprising:
    a brace connecting the top of said trimmer portion to one side of said handle means; and
    a vane having one end terminating at said intermediate region at its lower extremity and its opposite end secured to said cylindrical cutting member.

4. The invention as defined in claim 3 wherein said trimmer portion, said brace and said vane are integrally formed from a blank.

5. The invention as defined in claim 1 comprising:
    a brace connecting the top of said trimmer portion to one side of said handle means; and
    a vane having one end terminating at said trimmer portion between said lobes and its opposite end secured to said cylindrical cutting member.

6. The invention as defined in claim 5 wherein said trimmer portion, said brace and said vane are integrally formed from a blank.

References Cited

UNITED STATES PATENTS

| | | | |
|---|---|---|---|
| 1,866,073 | 7/1932 | Aberle | 172—13 |
| 2,670,537 | 3/1954 | Campbell | 30—316 XR |
| 2,691,823 | 10/1954 | Dombrowski | 172—13 |
| 2,896,729 | 7/1959 | Brechlin | 30—300 XR |

ROBERT E. PULFREY, Primary Examiner

J. W. PETERSON, Assistant Examiner